United States Patent [19]
Colberg et al.

[11] Patent Number: 5,344,465
[45] Date of Patent: Sep. 6, 1994

[54] COLORANT MIXTURES CONTAINING AZO COMPOUNDS BASED ON PHENYLOXADIAZOLYLANILINE

[75] Inventors: Horst Colberg, Ludwigshafen; Joachim Jesse, Weisenheim, both of Fed. Rep. of Germany

[73] Assignee: BASF Aktiengesellschaft, Ludwigshafen, Fed. Rep. of Germany

[21] Appl. No.: 856,890

[22] Filed: Mar. 25, 1992

Related U.S. Application Data

[63] Continuation of Ser. No. 475,205, Feb. 5, 1990, abandoned.

[30] Foreign Application Priority Data

Mar. 2, 1989 [DE]  Fed. Rep. of Germany ....... 3906525

[51] Int. Cl.$^5$ ...................... C09B 67/22; C09D 11/02
[52] U.S. Cl. ..................... 8/639; 106/22 K; 106/23 K; 524/86; 524/160; 524/161; 534/772
[58] Field of Search ................... 534/772; 106/22, 23, 106/22 K, 23 K; 8/639; 524/86, 160, 161

[56] References Cited

U.S. PATENT DOCUMENTS

| | | | |
|---|---|---|---|
| 4,201,710 | 5/1980 | Kurtz et al. ............ | 534/772 |
| 4,229,343 | 10/1980 | Junge et al. ............ | 534/772 |
| 5,104,991 | 4/1992 | Jesse et al. ............. | 548/131 |

FOREIGN PATENT DOCUMENTS

| | | | |
|---|---|---|---|
| 2457687 | 6/1976 | Fed. Rep. of Germany ...... | 534/772 |
| 2721955 | 11/1978 | Fed. Rep. of Germany ...... | 534/772 |

OTHER PUBLICATIONS

Ullmanns Encyklopadie der technischen Chemie, 4th Edition, vol. 12, pp. 525–538, W. Barendrecht, et al., "Harze, Naturliche", (no date is available, print as is).

Primary Examiner—Robert W. Ramsuer
Assistant Examiner—Fiona T. Powers
Attorney, Agent, or Firm—Oblon, Spivak, McClelland, Maier & Neustadt

[57] ABSTRACT

A colorant mixture for use in printing inks contains a pigment of formula I

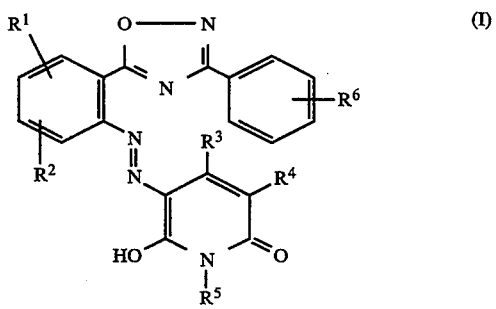

a basic dye of the formula II

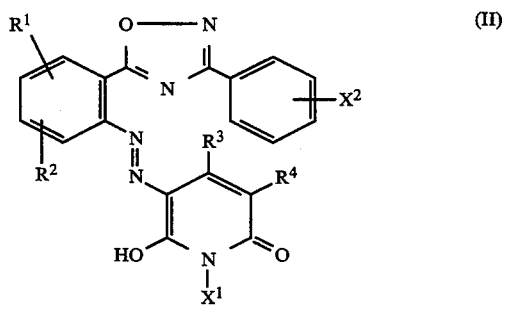

where the substituents are as defined in the specification L-A. and exhibits higher color strength than that of the pigment of formula I alone.

2 Claims, No Drawings

COLORANT MIXTURES CONTAINING AZO COMPOUNDS BASED ON PHENYLOXADIAZOLYLANILINE

This application is a continuation of application Ser. No. 07/475,205, filed on Feb. 5, 1990, now abandoned.

The present invention relates to novel colorant mixtures containing a pigment of the formula I

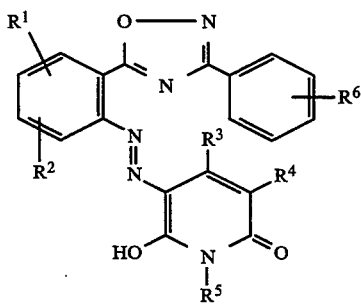

where $R^1$ is hydrogen, halogen, $C_1$–$C_4$-alkyl, $C_1$–$C_4$-alkoxy, trifluoromethyl or nitro, $R^2$ is hydrogen, halogen or nitro, $R^3$ is hydrogen or $C_1$–$C_4$-alkyl, $R^4$ is cyano, carbamoyl or acetyl, $R^5$ is hydrogen, $C_1$–$C_{10}$-alkyl, which may be substituted by hydroxyl and/or interrupted by one or two oxygen atoms, or $C_5$–$C_7$-cycloalkyl and $R^6$ is hydrogen, halogen, $C_1$–$C_4$-alkyl, $C_1$–$C_4$-alkoxy or nitro, and a basic dye of the formula II

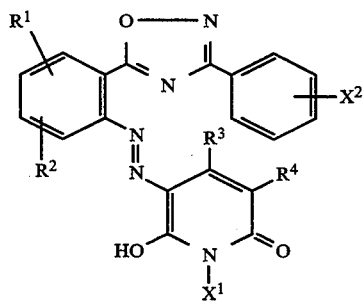

where $R^1$, $R^2$, $R^3$ and $R^4$ are each as defined above, $X^1$ is hydrogen, $C_1$–$C_{10}$-alkyl, which may be substituted by hydroxyl and/or interrupted by one or two oxygen atoms, $C_5$–$C_7$-cycloalkyl or the radical L-A, where L is straight-chain or branched $C_1$–$C_6$-alkylene and A is an amino-containing radical, and $X^2$ is hydrogen, halogen, $C_1$–$C_4$-alkyl, $C_1$–$C_4$-alkoxy, nitro or the radical L-A, where L and A are each as defined above, with the proviso that at least one of $X^1$ and $X^2$ is L-A.

DE-A-2 457 687 discloses pigments of formula I which inter alia may also find application in printing inks. However, since the pigments are not always obtained in the best physical form for a specific purpose, it is also pointed out therein that they can be converted in a conventional manner, such as salt milling and heating in water or solvents, into whichever is the most suitable form.

However, it is confirmed that, following such an aftertreatment of heating in water, the color strength of the pigment is not satisfactory for all purposes.

It has also been found that a pigment so after-treated is for example insufficiently dispersible for use in offset inks. This is evident in particular from the poor texture development and from unfavorable buildup characteristics in three-roll milling. However, a conventional coating of the pigment with a resin or resinate to improve its dispersibility gives pigment preparations which are weaker in color than the uncoated pigment.

It is an object of the present invention to provide new colorants which are free of these disadvantages.

We have found that this object is achieved by the colorants specified in more detail at the beginning, containing a pigment of the formula I and a basic dye of the formula II.

The basic dyes of the formula II are known from DE-A-2 721 955. It is also mentioned therein that these compounds are suitable for improving the flow characteristics of pigments. No further indications are provided.

It was surprising, then, that the addition of the basic dyes II to the specific pigments I produces colorant mixtures of higher color strength than that of a pigment of the formula I alone.

All the alkyl groups appearing in the abovementioned formulae I and II can be not only straight-chain but also branched.

$R^1$, $R^3$, $R^5$, $R^6$, $X^1$ and $X^2$ are each for example methyl, ethyl, propyl, isopropyl, butyl, isobutyl or sec-butyl.

$R^1$, $R^2$, $R^6$ and $X^2$ are each also for example fluorine, chlorine or bromine.

$R^1$, $R^6$ and $X^2$ are each also for example methoxy, ethoxy, propoxy, isopropoxy, butoxy, isobutoxy or sec-butoxy.

$R^5$ and $X^1$ are each also for example pentyl, isopentyl, neopentyl, tert-pentyl, hexyl, heptyl, octyl, 2-ethylhexyl, nonyl, decyl, 2-hydroxyethyl, 2- or 3-hydroxypropyl, 2- or 4-hydroxybutyl, 2-methoxyethyl, 2- or 3-methoxypropyl, 2- or 4-methoxybutyl, 2-ethoxyethyl, 2- or 3-ethoxypropyl, 2- or 4-ethoxybutyl, 2-propoxyethyl, 2- or 3-propoxypropyl, 2- or 4-propoxybutyl, 2-isopropoxyethyl, 2- or 3-isopropoxypropyl, 2- or 4-isopropoxybutyl, 2-(2-ethylhexyloxy)ethyl, 3,6-dioxaheptyl, 3,6-dioxaoctyl, cyclopentyl, cyclohexyl or cycloheptyl.

L is for example —$CH_2$—, —$(CH_2)_2$—, —$(CH_2)_3$—, —$(CH_2)_4$—, —$(CH_2)_5$—, —$(CH_2)_6$—, —$CH(CH_3)$—$CH_2$— or —$CH(CH_3)$—$CH(CH_3)$—.

A conforms for example to the formula

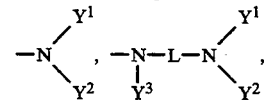

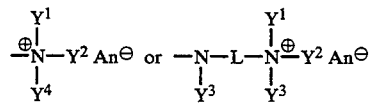

where

L is as defined above, $Y^1$, $Y^2$ and $Y^3$ are identical or different and each is independently of the others hydrogen, $C_1$–$C_{10}$-alkyl, which may be substituted by hydroxyl and/or interrupted by one or two oxygen atoms, benzyl, $C_5$-$C_7$-cycloalkyl or unsubstituted or $C_1$-$C_4$-alkyl-, $C_1$-$C_4$-alkoxy- or halogen-substituted phenyl, is hydrogen, $C_1$-$C_{10}$-alkyl, which may be substituted by hydroxyl and/or interrupted by one or two oxygen atoms, benzyl or $C_5$-$C_7$-cycloalkyl, and An$\ominus$ is an anion, or where the radical

is a 5-, 6 - or 7-membered heterocyclic radical.

Anions An$\ominus$ are each for example halide, such as fluoride, chloride, bromide or iodide, hydrogensulfate, sulfate, hydrogenphosphate, phosphate, borate, tetrafluoroborate, trichlorozincate, methosulfate, ethosulfate, benzenesulfonate, o- or p-toluenesulfonate, methylsulfonate, formate, acetate, propionate or hydroxyacetate.

A is specifically for example amino, mono- or dimethylamino, mono- or diethylamino, mono- or dipropylamino, mono- or diisopropylamino, mono- or dibutylamino, mono- or dipentylamino, mono- or dihexylamino, mono- or diheptylamino, mono- or dioctylamino, mono- or di(2-ethylhexyl)amino, mono- or dinonylamino, mono- or didecylamino, mono- or dibenzylamino, N-methyl-N-benzylamino, N-ethyl-N-benzylamino, phenylamine, 4-methylphenylamino, 4-methoxyphenylamino, 4-chlorophenylamino, N-methyl-N-phenylamino, cyclopentylamino, cyclohexylamino, cycloheptylamino, mono- or bis(2-hydroxyethyl)-amino, mono- or bis(2-methoxyethyl)amino, mono- or bis(2-ethoxyethyl)amino, mono- or bis(2- or 3-hydroxypropyl)amino, mono- or bis(2- or 3-methoxypropyl)amino, mono- or bis(2- or 3-ethoxypropyl)amino, N-methyl-N-(2-hydroxyethyl)amino, N-methyl-N-(2- or 3-hydroxypropyl)-amino, pyrrolidino, piperidino, morpholino, thiomorpholino, piperazino, N-($C_1$-$C_4$-alkyl)piperazino, hexamethyleneimino or a corresponding quaternary compound which has for example an additional hydrogen atom or an additional $C_1$-$C_4$-alkyl, benzyl, 2-hydroxyethyl or 2- or 3-hydroxypropyl radical.

A is also for example NH—$C_2H_4$—$NH_2$, NH—$C_2H_4$—$NHCH_3$, NH—$C_2H_4$—$N(CH_3)_2$, NH—$C_2H_4$—$NHC_2H_5$, NH—$C_2H_4$—$N(C_2H_5)_2$, NH—$C_3H_6$—$NH_2$, NH—$C_3H_6$—$NHCH_3$, NH—$C_3H_6$—$N(CH_3)_2$, NH—$C_3H_6$—$NHC_2H_5$, NH—$C_3H_6$—$N(C_2H_5)_2$, NH—$C_4H_8$—$NH_2$, NH—$C_4H_8$—$NHCH_3$, NH—$C_4H_8$—$N(CH_3)_2$, NH—$C_4H_8$—$NHC_2H_5$, NH—$C_4H_8$—$N(C_2H_5)_2$, NH—$C_2H_4$—$NHC_2H_4OH$, NH—$C_2H_4$—$N(C_2H_4OH)_2$,

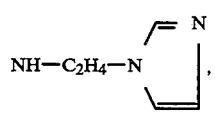

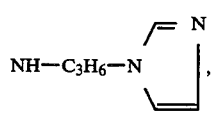

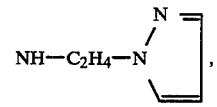

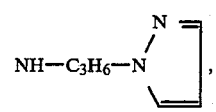

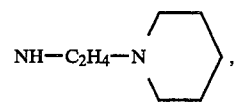

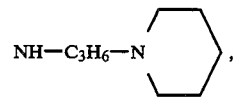

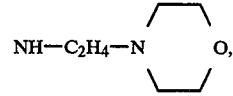

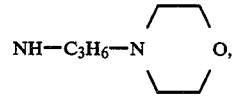

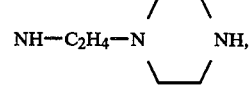

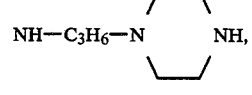

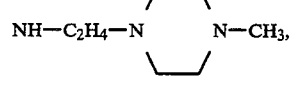

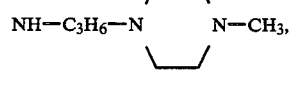

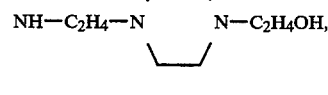

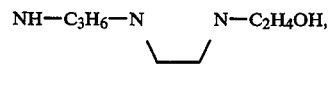

or a corresponding quaternary compound which has for example an additional hydrogen atom or an additional $C_1$-$C_4$-alkyl, benzyl, 2-hydroxyethyl, or 2- or 3-hydroxypropyl radical.

Preference is given to colorant mixtures containing a pigment of the formula I and a basic dye of the formula II where in both the formula I and the formula II $R^1$ is hydrogen, chlorine, bromine, methyl, methoxy, trifluoromethyl or nitro, $R^2$ is hydrogen, chlorine, bromine or nitro, $R^3$ is hydrogen or $C_1$-$C_3$-alkyl and $R^4$ is cyano, carbamoyl or acetyl, and in the formula I only $R^5$ is hydrogen, $C_1$-$C_4$-alkyl or $C_5$-$C_7$-cycloalkyl and $R^6$ is hydrogen, chlorine, bromine, methyl, methoxy or nitro, and in the the formula II only $X^1$ is hydrogen, $C_1$-$C_4$-alkyl or the radical L-A and $X^2$ is hydrogen, chlorine, bromine, methyl, methoxy, nitro or L-A, where L and A are each as defined above.

Particular preference is given to colorant mixtures containing a pigment of the formula I and a basic dye of the formula II where in both the formula I and the formula II $R^1$ is hydrogen, chlorine or bromine, $R^2$ is hydrogen, $R^3$ is $C_1$-$C_3$-alkyl and $R^4$ is cyano, carbamoyl or acetyl, and in the formula I only $R^5$ is hydrogen and $R^6$ is hydrogen, chlorine, bromine, methyl, methoxy or nitro, and in the formula II only $X^1$ is hydrogen or L-A and $X^2$ is hydrogen, chlorine, bromine, methyl, methoxy, nitro or L-A, where L and A are each as defined above.

Particular preference is further given to colorant mixtures which contain a basic dye of the formula II where only $X^1$ is L-A.

The pigments of the formula I and/or the basic dyes of the formula II can also be present in the novel colorant mixtures as mixtures.

The colorant mixtures according to the present invention contain in general from 75 to 98 mol %, preferably from 85 to 95 mol %, of a pigment of the formula I or a mixture thereof and from 25 to 2 mol %, preferably from 15 to 5 mol %, of a basic dye of the formula II or a mixture thereof, each percentage being based on the total molar amount of pigment and dye.

The novel colorant mixtures are prepared in a conventional manner, for example by mixing the water-moist press cakes of pigment I and dye II or else by dry mixing pigment I and dye II.

Preferably, however, the colorant mixtures according to the present invention are prepared by mixed coupling. To prepare the particularly preferred colorant mixtures which contain a basic dye of the formula II where only $X^1$ is L-A, this means for example that the particular phenyloxadiazolylaniline is diazotized and then coupled to a mixture which contains the coupling components underlying the pigment I and the dye II.

A phenyloxadiazolylaniline can be diazotized for example as described in DE-A-2 457 687 using nitrosylsulfuric acid in sulfuric acid. A further possibility comprises for example diazotizing a phenyloxadiazolylaniline obtained as described in earlier German Patent Patent Application P 39 05 242.7 with sodium nitrite in hydrochloric acid.

Particularly preferred colorant mixtures further contain a dispersant. The dispersant content is in general from 5 to 50% by weight, preferably from 10 to 35% by weight, in particular from 10 to 25% by weight, each percentage being based on the total weight of pigment I and dye II.

The dispersants are substances known per se, such as resins or derivatives thereof or surfactants.

Suitable dispersants are for example those which are based on natural or synthetic resins. These resins include in particular resin acids, such as abietic acid, pimaric acid or mixtures thereof, or resin which contains the resin acids.

The resin acids can also be modified, for example by hydrogenation, disproportionation, dismutation, polymerization, reaction with maleic or fumaric acid or reaction with polyalcohols, such as glycerol, pentaerythritol or alkylene glycols.

Modified resin acids also include for example maleic or fumaric acid adducts which have been partially esterified with polyols, such as glycerol or pentaerythritol, or reaction products of resins of maleinized resins with phenolic derivatives or condensation products of formaldehyde and phenol.

Furthermore, suitable dispersants are for example metal salts of resins, such as resinares of calcium, barium, aluminum, zinc or zirconium. Dispersants based on resins are described for example in Ullmanns Encyklopädie der technischen Chemie, 4th edition, volume 12, pages 525–537.

The additional presence of a dispersant makes the novel colorant mixtures particularly readily dispersible.

The colorant mixtures according to the present invention may be used with advantage in printing inks, in particular in flushed pastes or offset printing inks. To this end they are incorporated into the printing inks in a conventional manner.

The Examples which follow further illustrate the invention.

Preparation of an Offset Ink

To prepare an offset ink which contains 12% by weight of pigment, an appropriate amount of the pigment was stirred into a varnish composed of 40 parts by weight of Alresat ® SKA (from Albert, Wiesbaden), 20 parts by weight of refined linseed oil and 40 parts by weight of mineral oil PKWF 6/9 (from Haltermann, Hamburg) and then predispersed with a Dispermat dissolver (toothed disk diameter 3 cm, 12,000 rpm) at 70° C. for 10 minutes. The ink was then milled three times at 10 bar on an SDY 200 Bühler mill temperature-controlled to 35° C.

Determination of the Transparency

The offset ink was diluted on a flatstone mill (Englemann) with Alkydal ® F 681 (from Bayer, Leverkusen)—75% strength by weight in white spirit —to a pigment content of 10% by weight and mixed under a load of 25 kg. The mixture was applied with an Erichsen film former to black and white contrast cardboard in a film thickness of 100 μm immediately following addition to the mixture on the flatstone of about 8 drops of a drier (Octa Soligen cobalt (1.7%), lead (15.7%), liquid from Hoechst). The transparency was rated visually over black (5 representing the highest value) and measured in terms of scattering differences (AE) with an RFC 16 colorimeter from Zeiss (d/8°).

EXAMPLE 1

590 g of 2-(3-phenyl-1,2,4-oxadiazol-5-yl)aniline (obtained as per Example 2 of earlier German Patent Application P 39 05 242.7) were heated to 90° C. in 7 l of water and 0.8 l of concentrated hydrochloric acid. After cooling back down to room temperature, the mixture was dispersed at that temperature for 12 hours. It was then cooled down to 10° C. with ice and diazotized with 0.7 l of 23% strength by weight aqueous sodium nitrite solution. After 3 hours' stirring excess nitrite was destroyed with amidosulfuric acid, and 349 g of 3-cyano-6-hydroxy-4-methylpyrid-2-one in 4.2 l of water and 150 ml of 50% strength by weight sodium hydroxide solution were added, followed by 47 g of an externally basic pyridone of the formula

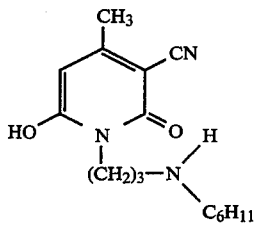

in 100 ml of dilute hydrochloric acid. The mixture was then heated to 95° C. and subsequently stirred at that temperature for an hour. The suspended solids were then isolated, washed and dried at 70° C. 982 g of a yellow dye were obtained.

COMPARATIVE EXAMPLE 1

Example 1 of DE-A-2 457 687 was replicated to prepare the pigment of the formula

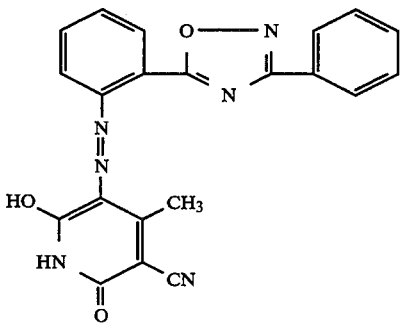

except that it was stirred at 40° C. for one hour before being isolated by filtering off with suction, washing and drying at 65° C.

COMPARATIVE EXAMPLE 2

590 g of 2-(3-phenyl-1,2,4-oxadiazol-5-yl)aniline (obtained as described in Example 2 of earlier German Patent Application P 39 05 242.7) were heated to 90° C. in 7 l of water and 0.8 l of concentrated hydrochloric acid. After cooling back down to room temperature, the mixture was dispersed at that temperature for 12 hours. The mixture was then cooled down to 10° C. with ice and diazotized with 0.7 l of 23% strength by weight aqueous sodium nitrite solution. After 3 hours' stirring, excess nitrite was removed with amidosulfuric acid, and 373 g of 3-cyano-6-hydroxy-4-methylpyrid-2-one in 4.5 l of water and 160 ml of 50% strength by weight sodium hydroxide solution were added.

The mixture was heated to 40° C. and subsequently stirred at that temperature for an hour. The pigment was then filtered off with suction, washed with water and dried at 65° C. 952 g of a yellow pigment were obtained.

An offset printing ink of a pigment prepared as described in Example 1 is distinctly stronger in color than an offset ink of corresponding amounts of a pigment of Comparative Example 1 or 2.

EXAMPLE 2

Example 1 was repeated, except that the resulting suspension was heated to 95° C. and adjusted to pH 9.5 with sodium hydroxide solution. 226 g of rosin (as a 10% strength by weight solution in dilute sodium hydroxide solution) were added and subsequently stirred in at 95° C. for one hour. The mixture was then adjusted to pH 5 with dilute hydrochloric acid and cooled down to room temperature. Isolating, washing and drying at 65° C. gave 1,215 g of a yellow pigment product.

An offset ink prepared from said pigment product is stronger in color than an ink prepared from a pigment of Comparative Example 1 or 2. The pigment product is distinctly better dispersible than the pigments of Comparative Examples 1 and 2 and is more transparent (Table).

EXAMPLE 3

Example 2 was repeated, except that 339 g of rosin were used. 1,296 g of a yellow pigment product were obtained.

An offset ink prepared from the pigment product of Example 3 is distinctly superior to the pigments of Comparative Examples 1 and 2 in dispersibility and transparency (Table).

EXAMPLE 4

590 g of 2-(3-phenyl-1,2,4-oxadiazol-5-yl)aniline were diazotized as described in Example 1. After excess nitrite had been destroyed with amidosulfuric acid, 358 g of 3-cyano-6-hydroxy-4-methylpyrid-2-one in 4.3 l of water and 155 ml of 50% strength by weight of sodium hydroxide solution were added to the reaction mixture, followed by 36 g of a pyridone of the formula

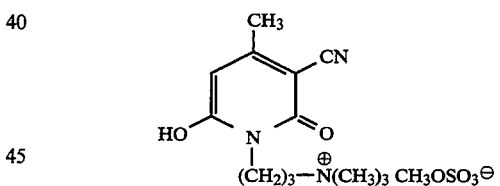

in water. The mixture was then heated to 80° C., adjusted to pH 9.5 with 50% strength by weight sodium hydroxide solution and admixed with 226 g of rosin (as a 10% strength by weight solution in sodium hydroxide solution). The mixture was stirred at 80° C. for one hour, adjusted to pH 5 with hydrochloric acid and cooled down to room temperature. Filtering off with suction and washing and drying at 65° C. left 1,192 g of a yellow pigment product.

An offset ink prepared from said pigment product of Example 4 is distinctly superior to the pigments of Comparative Examples 1 and 2 in dispersibility and transparency (Table).

EXAMPLE 5

590 g of 2-(3-phenyl-1,2,4-oxadiazol-5-yl)aniline were diazotized as described in Example 1 of DE-A-2 457 687. After excess nitrite had been destroyed with amidosulfuric acid, 358 g of 3-cyano-6-hydroxy-4-methylpyrid-2-one in 4.3 l of water and 135 ml of 50% strength by weight sodium hydroxide solution were added to the reaction mixture, followed by 43 g of a pyridone of formula

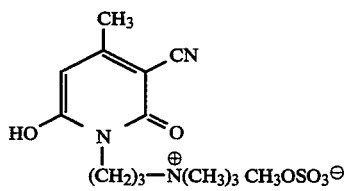

in water. The mixture was then heated to 80° C. and subsequently stirred at 80° C. for one hour.

The pigment was filtered off with suction, washed and dispersed in 3.5 l of water at 80° C. 226 g of rosin (as a 10% strength by weight solution in sodium hydroxide solution) were added and subsequently stirred in at that temperature for an hour, and the mixture was adjusted to pH 5 with dilute sulfuric acid. The mixture was subsequently stirred at 80° C. for 2 hours. After cooling down to room temperature, the solids were filtered off with suction, washed and dried at 65° C. 1,162 g of a yellow pigment product were obtained.

An offset ink prepared from said pigment product of Example 5 is distinctly superior to the pigments of Comparative Examples 1 and 2 in dispersibility and transparency ( Table ).

EXAMPLE 6

590 g of 2-(3-phenyl-1,2,4-oxadiazol-5-yl)aniline were diazotized as described in Example 1 of DE-A-2 457 687. After excess nitrite had been destroyed with amidosulfuric acid, 349 g of 3-cyano-6-hydroxy-4-methylpyrid-2-one in 4.2 l of water and 150 ml of 50% strength by weight sodium hydroxide solution were added to the suspension, followed by 47 g of an externally basic pyridone of formula

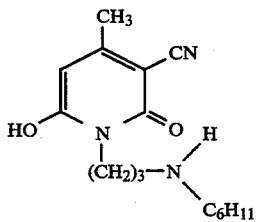

in 100 ml of dilute hydrochloric acid. The mixture was subsequently heated to 80° C., stirred at that temperature for 1 hour, and filtered with suction, and the pigment was washed with water.

The pigment was subsequently dispersed in 35 l of water at 95° C. 226 g of rosin (as a 10% strength by weight solution in sodium hydroxide solution) were added to the suspension, which was subsequently stirred at 95° C. for an hour and adjusted to pH 5 with dilute sulfuric acid. After cooling down to room temperature, the solids were filtered off with suction, washed and dried at 65° C. 1,200 g of a yellow pigment product were obtained.

The offset ink prepared from the pigment product of Example 6 is stronger in color than inks prepared with the pigments of Comparative Examples 1 and 2. The product is distinctly better dispersible than the pigments of Comparative Examples 1 and 2. The transparency (Table) is likewise better than in the comparative examples.

TABLE

| Example No. | Transparency Visually | Scattering differences |
|---|---|---|
| Comparison 1 | Comparison | 64.2 |
| Comparison 2 | Comparison | 64.4 |
| 1 | −1 | 68.9 |
| 2 | +5 | 49.7 |
| 3 | +4 | 51.2 |
| 4 | +4 | 53.2 |
| 5 | +4 | 52.7 |
| 6 | +4 | 53.0 |

We claim:

1. A colorant mixture containing a pigment of the formula I

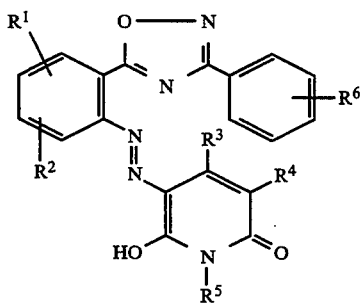

where
$R^1$ is hydrogen, bromine
$R^2$ is hydrogen,
$R^3$ is methyl,
$R^4$ is cyano,
$R^5$ is hydrogen,
$R^6$ is hydrogen; and
a basic dye of the formula II

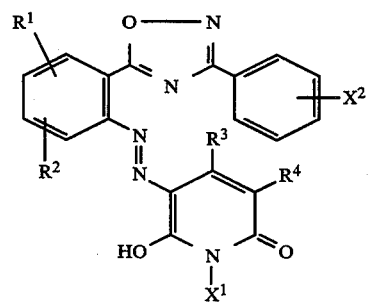

where
$R^1$, $R^2$, $R^3$ and $R^4$ are each as defined above,
$X^1$ is
$(CH_2)_3$—NH—$C_6H_{11}$ or $(CH_2)_3$—$N(CH_3)_3$ An,$\oplus$ $\ominus$
An $\ominus$ is an anion and
$X^2$ is hydrogen.

2. A colorant mixture as claimed in claim 1, containing 75–98 mol % of a pigment of the formula I and 25–2 mol % of basic dye of the formula II or a mixture thereof, each percentage based on the total molar amount of pigment and dye.

* * * * *